(12) United States Patent
Dolloff

(10) Patent No.: US 7,310,440 B1
(45) Date of Patent: Dec. 18, 2007

(54) REPLACEMENT SENSOR MODEL FOR OPTIMAL IMAGE EXPLOITATION

(75) Inventor: John Thomas Dolloff, Escondido, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1081 days.

(21) Appl. No.: 10/038,644

(22) Filed: Jan. 8, 2002

Related U.S. Application Data

(60) Provisional application No. 60/305,440, filed on Jul. 13, 2001.

(51) Int. Cl.
*G06K 9/00* (2006.01)

(52) U.S. Cl. .................. 382/154; 345/427; 382/103; 382/293

(58) Field of Classification Search ............... 382/154, 382/293, 294, 295, 103; 345/427
See application file for complete search history.

(56) References Cited

U.S. PATENT DOCUMENTS

| | | | | |
|---|---|---|---|---|
| 5,355,442 A * | 10/1994 | Paglieroni et al. | .......... | 345/427 |
| 5,422,989 A * | 6/1995 | Bell et al. | .......... | 345/689 |
| 5,550,937 A * | 8/1996 | Bell et al. | .......... | 382/293 |
| 5,796,879 A * | 8/1998 | Wong et al. | .......... | 382/300 |
| 5,995,681 A * | 11/1999 | Lee et al. | .......... | 382/293 |
| 6,064,760 A * | 5/2000 | Brown | .......... | 382/154 |
| 6,226,035 B1 * | 5/2001 | Korein et al. | .......... | 348/335 |
| 6,278,798 B1 * | 8/2001 | Rao | .......... | 382/154 |
| 6,282,496 B1 * | 8/2001 | Chowdhary | .......... | 701/220 |
| 6,504,957 B2 * | 1/2003 | Nguyen et al. | .......... | 382/209 |
| 6,512,857 B1 * | 1/2003 | Hsu et al. | .......... | 382/294 |
| 6,587,601 B1 * | 7/2003 | Hsu et al. | .......... | 382/294 |
| 6,597,818 B2 * | 7/2003 | Kumar et al. | .......... | 382/294 |
| 6,697,736 B2 * | 2/2004 | Lin | .......... | 701/214 |
| 6,735,348 B2 * | 5/2004 | Dial et al. | .......... | 382/293 |
| 6,795,590 B1 * | 9/2004 | Chen | .......... | 382/294 |
| 6,810,153 B2 * | 10/2004 | Komura et al. | .......... | 382/295 |
| 6,947,590 B2 * | 9/2005 | Magarey et al. | .......... | 382/164 |
| 6,989,754 B2 * | 1/2006 | Kisacanin et al. | .......... | 340/576 |
| 2001/0036302 A1 * | 11/2001 | Miller | .......... | 382/128 |
| 2002/0072869 A1 * | 6/2002 | Stiller | .......... | 702/90 |
| 2006/0111841 A1 * | 5/2006 | Tseng | .......... | 701/301 |
| 2007/0051890 A1 * | 3/2007 | Pittman | .......... | 250/332 |
| 2007/0075893 A1 * | 4/2007 | Filias et al. | .......... | 342/104 |

* cited by examiner

*Primary Examiner*—Gregory M Desire
(74) *Attorney, Agent, or Firm*—Cooley Godward Kronish LLP; Daniel J. Long

(57) ABSTRACT

A replacement sensor model for optimally exploiting imaging data obtained by an image sensor. The replacement sensor model includes a ground-to-image function such as a polynomial for converting three-dimensional ground point data to two-dimensional image (pixel) data. Coefficients of the polynomial can be determined from a rigorous sensor model of the image sensor, which reflects physical characteristics of the particular image sensor. The polynomial can be adjusted by an adjustment vector. The adjustment vector can be determined from a pre-determined list of possible adjustment components having particular characteristics relating to the image sensor and reflecting errors in the physical characteristics of the image sensor as included in the rigorous sensor model. Finally, an error covariance associated with the adjustment vector can be determined from an error covariance associated with the rigorous sensor model. The adjusted polynomial and error covariance of the replacement sensor model permit optimal image exploitation, including error propagation and geopositioning.

16 Claims, 8 Drawing Sheets

REPLACEMENT SENSOR MODEL FOR OPTIMAL IMAGE EXPLOITATION

RELATED APPLICATIONS

This application claims priority to U.S. Provisional Application No. 60/305,440, filed Jul. 13, 2001, the entire content of which is hereby incorporated by reference

BACKGROUND OF THE INVENTION

1. Field of the Invention

The present invention relates to sensor models for describing a ground-to-image relationship for image sensors. More specifically, the present invention relates to a replacement sensor model that is generic to a plurality of image sensors and that reliably provides a full range of image exploitation.

2. Description of the Related Art

Image sensors are widely-known tools for obtaining images of various objects. More particularly, image sensors such as airborne or space-borne image sensors are known to be useful in obtaining images of underlying objects as the sensors pass by or over the objects. Various characteristics of these objects that are demonstrated by the resultant images can then be observed, including a temperature of the object, its position (latitude, longitude and/or elevation), its appearance, its color, its relation to another object, etc.

Since there exist these various characteristics of the imaged objects that can be observed, the term "image exploitation" is generically used to refer to a use to which an image is put. A subset of image exploitation is referred to as "geopositioning," where, for example, an image is exploited by determining a latitude and longitude of the imaged object based on the image. Another example is determining latitude and longitude along with elevation of the image object based on multiple images. Geopositioning is considered "optimal" when it is performed in a manner such that its solution errors are minimized. This, in turn, requires statistical knowledge of the errors affecting the solution, such as the error in the knowledge of the sensor's position when the image was taken.

Image sensors such as those just discussed have various internal characteristics such as focal length, as well as various external characteristics such as location and attitude of the sensor at a given point in time. These characteristics, which vary individually by sensor, are the typical sources of error just referred to. These sources of error must be accounted for in order to obtain reliable and accurate image information, and/or to be aware of a possible extent of any resulting errors. Such characteristics and their specific values are conventionally referred to as "support data," or "sensor support data." The support data can be obtained by, for example, receipt of navigational data transmitted from the image sensor's platform to a ground station. For example, data may be obtained from a Global Positioning System (GPS) receiver on board a satellite.

An imaging methodology that reflects the above-discussed concepts is known as a "sensor model," or, more specifically, a "rigorous (or physical) sensor model." Specifically, a rigorous sensor model for an image sensor such as the one discussed above relates ground coordinates (i.e., three-dimensional data pertaining to the imaged object) to image coordinates (i.e., two-dimensional pixel data for the image of the object), utilizing the sensor support data that accompany each image and that specify sensor characteristics at a time the image was obtained, as discussed above.

As demonstrated in FIG. 1, a sensor model 110 consists of a ground-to-image transformation; i.e., a mathematical function with a three-dimensional ground coordinate set 120 as input and a two-dimensional image (pixel) location as output 130. The ground-to-image transformation of sensor model 110 is parameterized by the support data and as such is descriptive of the sensor's characteristics. The transformation of ground coordinates into image coordinates effected by sensor model 110 is thus described by Equation (1):

$$u = F(X,S) \text{ and } v = G(X,S), \quad (1)$$

where u and v are the image pixel coordinates, X is a three dimensional vector describing the ground data as discussed above, and S is the sensor support data state vector (the error covariance shown in FIG. 1 is discussed in detail below).

The sensor model 110 is routinely used in image exploitation. As an example of this type of use of the sensor model 110, the geopositioning process referred to above will be discussed in more detail.

Proper geopositioning conventionally exists of two types of solutions: ground point (target) extraction and triangulation. The first of these two is obtained by the Extraction Process, where the location of ground point(s) is extracted from the two dimensional image coordinates of the object identified and measured in the image(s). For example, an operator of an image sensor within a satellite may obtain a plurality of images of relatively large areas on the earth's surface, such as a city or a portion of a city. Such an area of the entire image is typically known as the "image footprint." Corresponding image data may then be stored by the operator, along with the support data of the image sensor applicable at the time the image was taken. In this way, a location of a particular target object such as a particular building within the city may be "extracted" from the image data.

In order to perform this process, for example using one image, an inverse transformation of the sensor model 110 and associated equation (1) is used; i.e., pixel data (u,v) and the vertical component of X, known a priori, are used as inputs to obtain the two horizontal components of X as outputs. The inverse transformation is typically a numerical, iterative inverse of the ground-to-image function. The support data state vector S is treated as a vector of fixed parameters. Examples of the Extraction Process are discussed in more detail below with respect to FIGS. 2-5.

The inverse transformation is a straight-forward solution technique applicable to one image. However, in order to also provide estimates of the one image solution accuracy, as well as utilize more than one image, a more sophisticated approach is required. This approach is characterized by the "M-image Extraction Algorithm." This algorithm is discussed in detail below; generally speaking, however, the algorithm utilizes various image data corresponding to a plurality of images of the same target object, at least some of which offer different perspectives of the object.

Multiple perspectives are required to extract three dimensional ground positions from two dimensional images. Also, each of the images are weighted (criteria for performing the weighting is also discussed below), and the ground point locations are solved for iteratively in an optimal fashion (i.e., an estimate of X is used to begin iteration of the algorithm leading to progressively more accurate estimates of X). Solution accuracy estimates are also provided.

FIG. 2 illustrates the role of the sensor model's ground-to-image transformation in the extraction of a ground point 210 using a stereo pair of images 220 and 230. In FIG. 2, images 220 and 230 may either be obtained by two separate image sensors (perhaps at the same point in time), or by a single image sensor at different points in time. In FIG. 2, the ground-to-image transformation (or its inverse) specifies the image rays. The image rays intersect the image coordinates measured in each image.

FIG. 2 assumes perfect sensor support data. However, as discussed above, there will virtually always be errors in the sensor support data, as illustrated by incorrect sensor position/orientation 310 in FIG. 3, and any such errors will propagate to errors in extracted ground points. Thus, the support data errors should be accounted for during extraction in some manner in order to achieve optimal image exploitation (i.e., here, optimal geopositioning).

One way of accounting for support data errors is to determine a statistical "outer bound" or possible extent of the support data errors as they propagate to errors in the extracted ground points. For example, support data may indicate that a satellite (and its image sensor) was in a certain position at the time a given image was taken. An error in this data (i.e., the satellite was not actually at that exact position) may result is an extracted ground point being calculated as being, for example, up to ten meters off from its actual location. Such knowledge of this extent to which the support data (and thus the determined position of the extracted ground point) is inaccurate is referred to as "error propagation." Error propagation can also refer to related concepts, such as, for example, a determination that a relative position between two particular imaged objects is accurate to within a particular distance.

Additionally, if a given image sensor obtains multiple images of a single object, or multiple image sensors each obtain a single image of an object(s), it would be useful to know which ones of the images are associated with more accurate support data. This knowledge is the primary criteria mentioned above that allows for the weighting of the multiple images in the M-image Extraction Algorithm, so that the more accurate images are given relatively more importance in arriving at a composite solution.

In short, it is useful to know an extent to which the support data is accurately known; i.e., an extent of errors contained in the support data. This knowledge is quantified by an "error covariance" matrix. Specifically, the quantification of the accuracy of sensor support data is represented by an a priori (initial) error covariance matrix of the support data (see FIG. 1). In its most general form, the a priori error covariance of the sensor support data errors is an (mn×mn) matrix, where m equals the number of images and n is the number of sensor support data error components per image.

The accuracy of the extracted ground point's location is quantified by its a posteriori (after solution) error covariance matrix. The a posteriori error covariance matrix is primarily a function of the number of images, their geometry, and the a priori error covariance matrix of the sensor support data. Along with the ground point solution, the a posteriori error covariance is also output from the M-image Extraction Algorithm.

Equation (2) formally defines the error covariances (all error processes are assumed unbiased, i.e., zero mean, and E{ } corresponds to expected value):

$C_S = E\{\epsilon S \epsilon S^T\}$, the sensor state vector a priori error covariance $P = E\{\epsilon X \epsilon X^T\}$, the extracted ground point a posteriori error covariance, where $\epsilon S$ and $\epsilon X$ are the error vectors (multi-variate random variables) associated with S and X  (2)

FIG. 4 illustrates the extraction of a ground point using multiple images from multiple image sensor positions 410a-410n, as might be performed by the M-image Extraction Algorithm. As in FIGS. 2 and 3, the ground-to-image transformation of the rigorous sensor model can be used to specify the image rays. Sensor support data errors prevent the multiple rays from intersecting at a common point, but the error covariance associated with the rigorous sensor model can quantify an extent of the errors, and thereby determine which rays correspond to more accurate support data. In this way, these rays can be given more weight in executing the algorithm. Generally, the more images utilized, the more accurate the ground point extraction (solution) will be.

FIGS. 2-4 have depicted only two of the three ground (object space) dimensions for simplicity. Images 510 and 520 in FIG. 5 further illustrate exemplary effects of support data errors, but in all three dimensions. Again, the image rays do not intersect due to the errors, but the error covariance will quantify an extent of the errors and thereby allow for error propagation and weighting of the images to obtain an optimal ground point extraction. In this particular example, both images are given equal weight; hence, the solution is at the midpoint of the minimum separation vector.

The above discussion has focused on the Extraction Process in performing optimal geopositioning. However, as mentioned above, geopositioning may also include the Triangulation Process.

In the Extraction Process, a location of a ground point(s) is extracted from image data, and an extent of support data errors, quantified by an error covariance matrix, permits error propagation and proper weighting of a plurality of images in obtaining an optimal ground point solution. The Triangulation Process also solves for the ground points, but additionally actually solves for the support data errors of all the images involved, and adjusts or reduces them so that a corresponding error(s) in the ground point solution or in subsequent extractions is actually reduced.

Solving for the support data errors according to the Triangulation Process typically requires additional information to be input into the process. For example, a location (ground point) of a control point within the image may be previously known to a great degree of accuracy, and can thus be used as a reference to actually solve for (and correct) errors in the sensor support data. Triangulation, as is known, typically involves a weighted least squares adjustment, using the a priori error covariance of the support data and the control points, and/or other previously-known information, to adjust the support data.

In summary, a complete sensor model consists of a ground-to-image transformation, the sensor support data, and the a priori error covariance of the sensor support data. The error covariance is relative to an identified set of sensor parameters. The relevant sensor support data errors are the dominant errors, such as sensor position error and attitude error. The support data a priori error covariance matrix quantifies the expected magnitude of the errors, the correlation between different error components from the same image, and, when applicable, the cross correlation between errors from different images (i.e., the extent to which errors in different images are related to one another). Error covariance can be used for extraction, including error propagation and weighting of a plurality of images. If additional information is known with respect to, for example, control points within the image footprint, error covariance can also allow solving for the sensor support data errors and adjusting them so as to obtain a more accurate determination of a target ground point(s).

Using the above techniques, rigorous sensor models are conventionally recognized as providing a ground-to-image transformation in support of optimal image exploitation, including geopositioning. However, since such rigorous sensor models are specific to particular image sensors, users of the image sensors must have access to the specific models. If a user is utilizing many different image sensors, the costs associated with obtaining, maintaining and utilizing all of the associated rigorous sensor models becomes burdensome. Moreover, many operators of image sensors do not wish to essentially share proprietary information relating to their equipment by distributing rigorous sensor models to users.

Therefore, a more general sensor model, termed the abstract sensor model, has been developed. It is also a ground-to-image function, and is conventionally expressed as a polynomial as shown in equation (3), although a ratio of two polynomials, commonly known as a rational function, is sometimes used:

$$u = a0 + a1x + a2y + a3z + a4xy +$$

$$v = b0 + b1x + b2y + b3z + b4xy + \quad (3)$$

In equation (3), x,y,z are the components of the ground position vector X and a0,a1, . . . ,b0,b1, . . . are the polynomial coefficients. Typically, X is relative to a ground coordinate system that is centered at the middle of the image footprint and scaled such that the coordinate values x, y, and z range from −1.0 to 1.0.

The ground-to-image function corresponds to the polynomial and the "support data" are the values of the polynomial coefficients. Such a conventional abstract sensor model has various advantages. For example, the user need not know nor obtain the specific rigorous sensor models. Thus, one such model can be used for many different sensors, which also affords a common interface for the distribution and use of imagery and its support data (since a given user only needs software corresponding to the polynomial, and can then simply "plug in" the values of the coefficients and image data).

Moreover, these advantages result in lower costs for user development and maintenance. The use of an abstract sensor model polynomial defining a conventional abstract sensor model can also result in higher user throughput, due to its usually faster evaluation as compared to the original sensor model. Finally, the use of a polynomial can lead to wider availability of a specific sensor's imagery, since the polynomial coefficients (unlike the actual support data) do not have any obvious, literal physical meaning and therefore do not provide detail into proprietary sensor characteristics (as the original sensor model does).

In generating coefficients for the polynomial, the rigorous sensor model is used to generate a grid of image pixel-ground point correspondences across a representative area of the image footprint, where the ground points correspond to multiple elevation planes. That is, a number of latitude, longitude and elevation points over a representative area of the footprint are selected and inserted into the ground-to-image function to generate corresponding image points. (Alternatively, a number of image points are selected and inserted into the corresponding image-to-ground function, along with an a priori elevation, to generate corresponding ground points.) The coefficients are then fit to the grid of resulting correspondences to obtain the coefficients' values. The original sensor model can use either original sensor support data or triangulated sensor support data. Any support data errors that still exist within the sensor model when generating the polynomial coefficients will be reflected within the coefficients. However, like the coefficients themselves, such errors will not have any apparent physical meaning and so can not conventionally be accurately quantified by an associated error covariance.

A straightforward method for performing the fit to determine the coefficients is the well-known least squares fitting process. The size of the "fit error," i.e., the difference in image coordinates between the polynomial evaluation and the original sensor model evaluation at a common ground point(s), depends on the form (degree) of the polynomial and the details of the fitting process. Such details of generating a conventional abstract sensor model polynomial as just described are conventionally well-known.

Equation (4) illustrates a typical polynomial abstract sensor model. It is order 2 in x, order 2 in y, and order 1 in z. Typical polynomial fit error is sub-pixel, with 0.01 pixel root-mean-square error not uncommon.

$$u = \sum_{i=0}^{2}\sum_{j=0}^{2}\sum_{k=0}^{1} a_{ijk} x^i y^j z^k \text{ and } v = \sum_{i=0}^{2}\sum_{j=0}^{2}\sum_{k=0}^{1} b_{ijk} x^i y^j z^k \quad (4)$$

Conventional abstract sensor models can match the ground-to-image relationship of an original sensor model with a great deal of accuracy for many image sensors. That is, they are generally capable of providing very similar image outputs when given the same ground point inputs (or vice-versa). Thus, such abstract sensor models can be used to perform a rudimentary extraction of a ground point target object from an image(s) as discussed above.

However, abstract sensor models have no associated error covariance that is equivalent in any meaningful way with the sensor support data error covariance of the rigorous sensor model. Without such an error covariance, conventional abstract sensor models can not perform useful error propagation, determine optimal weights to assign multiple images in determining a composite solution, or solve/correct for "support data" errors (i.e., support data errors reflected in the polynomial coefficients) in a triangulation process.

What is needed is an abstract model that provides an accurate but flexible ground-to-image relationship that is easy to use and applicable to many sensors, such as that provided by conventional abstract sensor models, together with a meaningful error covariance relative to a set of adjustable parameters that allows for optimal image exploitation, such as that conventionally provided by rigorous sensor models.

SUMMARY OF THE INVENTION

The present invention relates to a method for generating a replacement sensor model (RSM) data file for use in processing image data produced by an image sensor. The method may include: (1) generating parameters (e.g., polynomial coefficients) of a ground-to-image function based on a sensor model of the image sensor, the sensor model including support data describing physical characteristics of the image sensor, (2) defining adjustable parameters of the ground-to-image function to reflect errors in the support data, and (3) generating an error covariance relative to these adjustable parameters and containing information virtually equivalent to information contained in a support data error covariance. According to this method, the data file includes the identification and values of the ground-to-image function parameters, adjustable parameters, and adjustable parameters error covariance.

The present invention additionally relates to a system for permitting exploitation of imaging data by a plurality of users. The system may include an image sensor, a transmitter operable to transmit images obtained by the image sensor to the plurality of users and a replacement sensor model (RSM) data file generator for computing parameters of a replacement sensor model, including parameters of a ground-to-image function that is adjustable and an RSM error covariance associated with the adjustable function so as to reflect errors in support data describing the image sensor. One data file is generated per image and also transmitted to the plurality of users.

Additionally, the present invention relates to a method for exploiting imaging data. The method may include inputting, into a processor, replacement sensor model data files, each containing an abstract ground-to-image function for a generic image sensor, as well as an image obtained by an image sensor. The method may also include using the processor to calculate a position of a chosen ground point(s) within the images using the data files. In this method of the invention, a data file includes parameters of the ground-to-image function, a set of adjustable parameters (adjustment vector) operable to adjust the function to correct for errors in the data, and an error covariance corresponding to the vector of adjustable parameters.

Finally, the present invention also relates to a replacement sensor model (RSM). The replacement sensor model includes a ground-to-image function, the function being generated from data describing physical characteristics of the image sensor, an adjustment vector for adjusting the function so as to reflect errors in the data, and an error covariance associated with the adjustment vector that contains virtually identical information as an error covariance of a rigorous sensor model of the image sensor.

The features and advantages of the invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
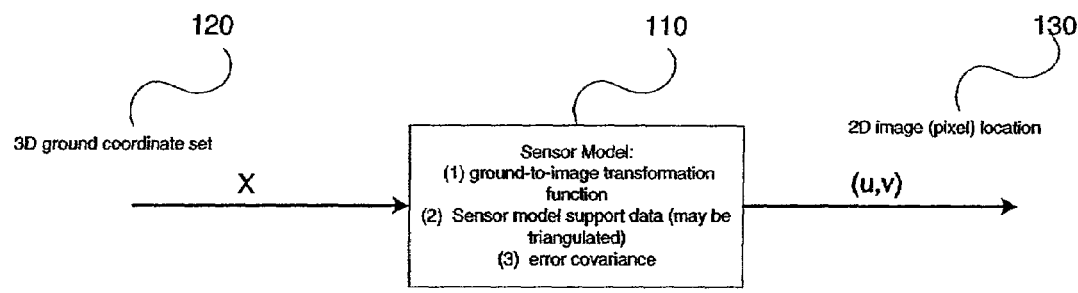
FIG. 1 illustrates a rigorous sensor model of the prior art.
Figure 2:
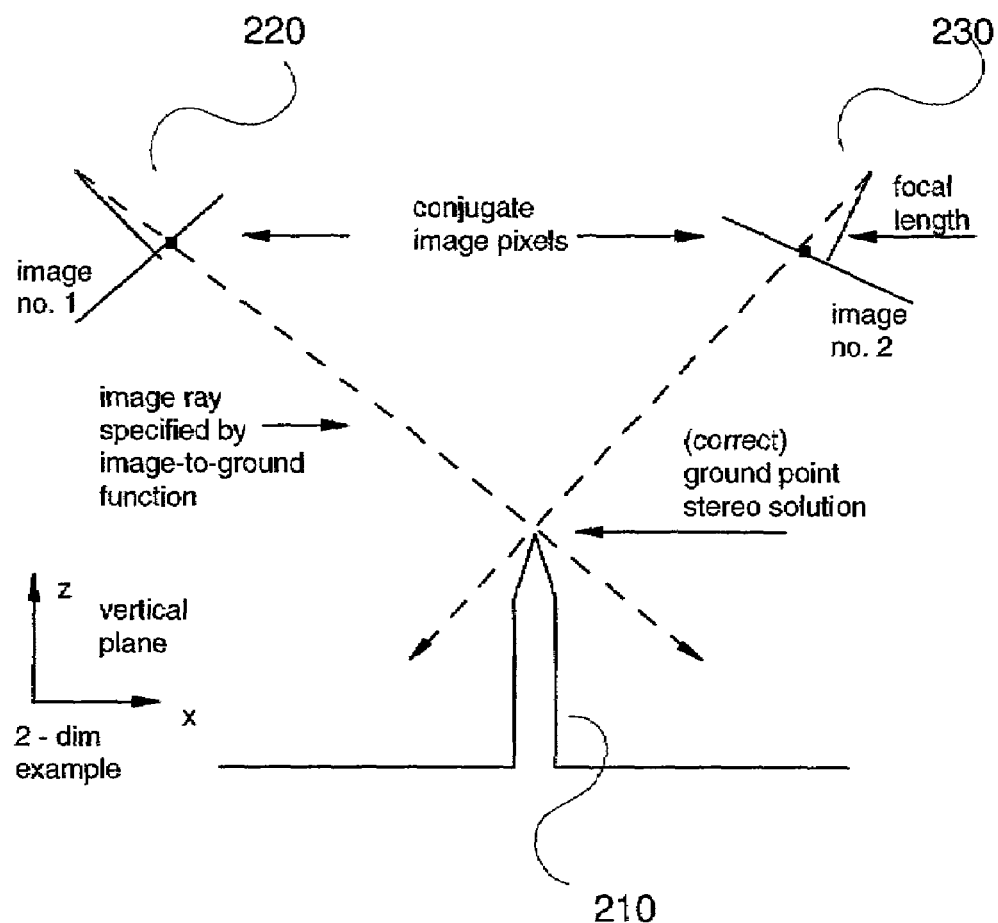
FIG. 2 illustrates the role of the ground-to-image transformation of the sensor model of FIG. 1 in the extraction of a three dimensional ground point using a stereo pair of images.
Figure 3:
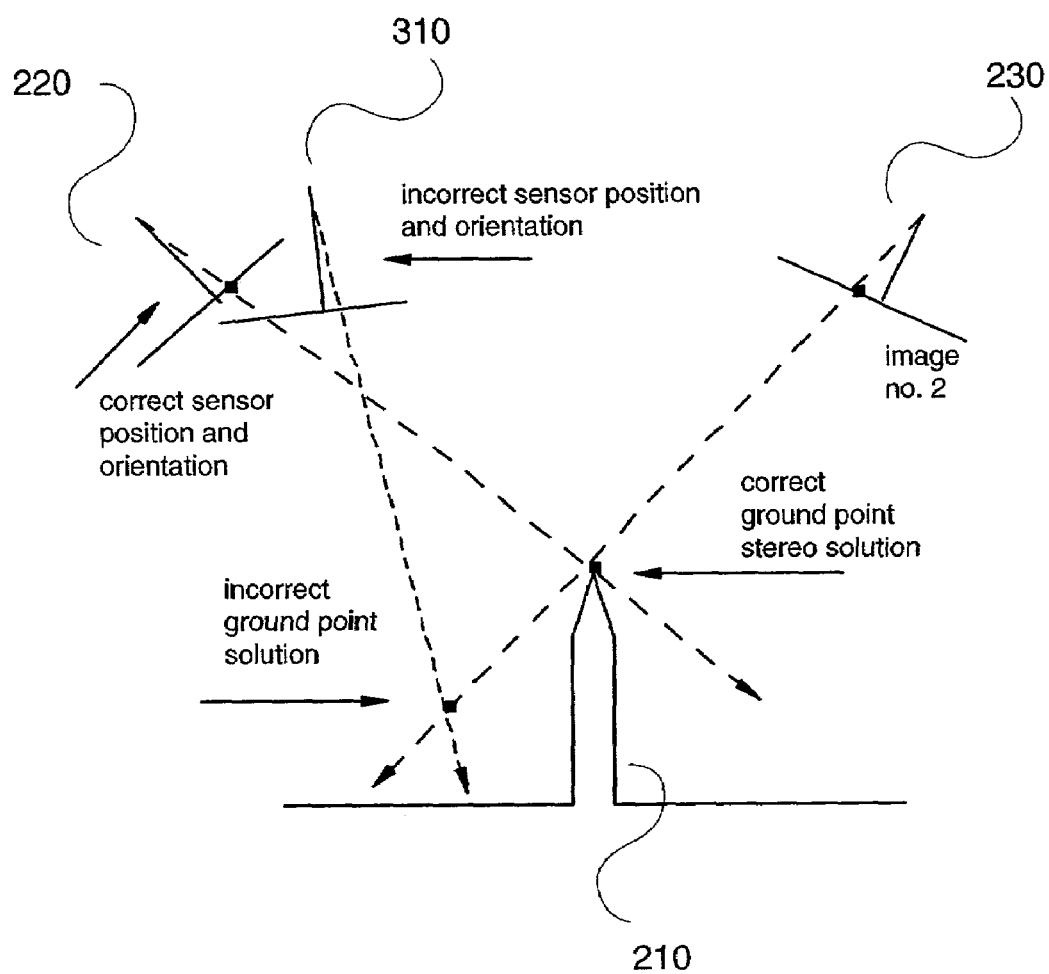
FIG. 3 illustrates an effect of erroneous image sensor support data on a ground point stereo solution of FIG. 2.
Figure 4:
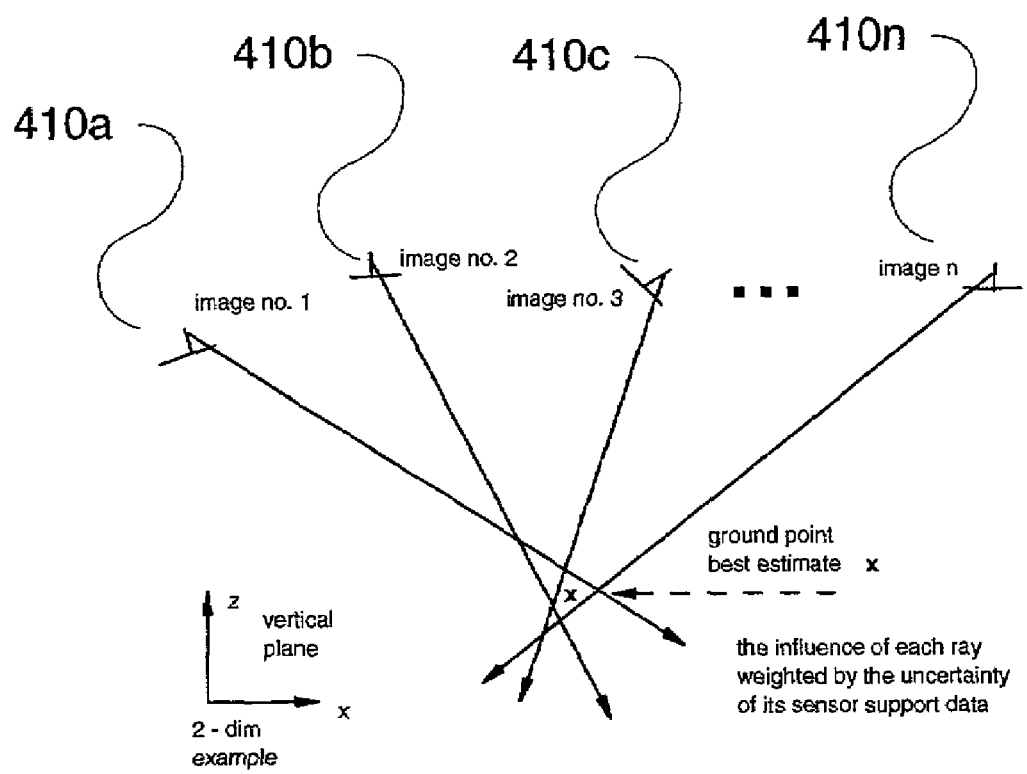
FIG. 4 illustrates the extraction of a ground point using multiple images.
Figure 5:
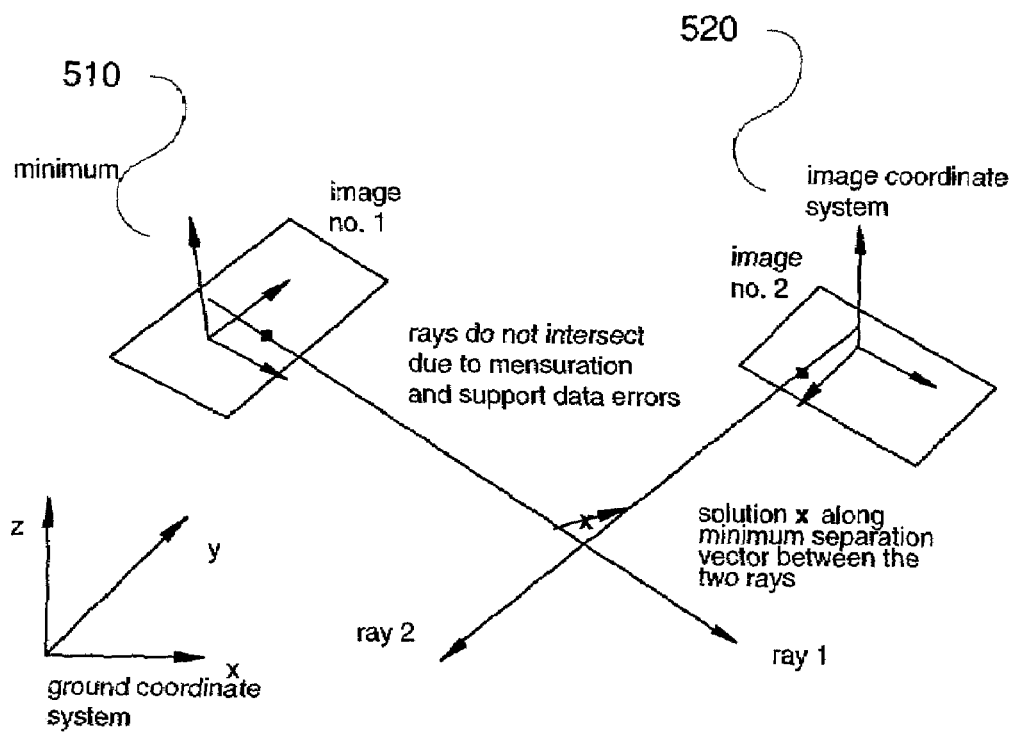
FIG. 5 further illustrates an example of the effects of support data errors in three dimensions.

While the present invention is described below with respect to various exemplary embodiments, the present invention is not limited to only those embodiments that are disclosed. Other embodiments can be implemented by those skilled in the art without departing from the spirit and scope of the present invention.

In one exemplary embodiment, the present invention includes an abstract sensor model that is capable of all the functionality of a rigorous sensor model and provides greatly improved image exploitation over conventional abstract sensor models, and that includes adjustability and an error covariance containing information equivalent to the information contained in a sensor support data error covariance.

Such an abstract sensor model is termed a replacement sensor model (RSM). A replacement sensor model according to one embodiment of the present invention includes a ground-to-image mathematical transformation function for converting three-dimensional ground point data into two-dimensional image (pixel) data. The function, by itself, is applicable to virtually any sensor. The function could include, for example, a polynomial, a ratio of polynomials or an interpolated grid of ground point-image point correspondences. Parameters of the function (e.g., coefficients of the polynomial) are determined by fitting the parameters to the support data of a particular image sensor; i.e., by fitting the parameters to a ground point-image point correspondence grid corresponding to an image footprint and mathematically generated using the rigorous sensor model.

Types of adjustable parameters are selected for the mathematical function that relate to types/sources of support data error and that permit the calculation of an RSM error covariance containing information equivalent to information contained in the sensor support data error covariance of the rigorous sensor model. The parameters may be thought of as forming an adjustment vector A, and together allow for the generation of the RSM error covariance.

Since the actual support data errors are unknown, the actual values of the adjustable parameters (i.e., the adjustment vector) will be zero during an initial iteration of, for example, a ground point extraction algorithm. Nevertheless, the existence of the error covariance associated with the replacement sensor model and its adjustable parameters, once generated, allows a user of the RSM to practice error propagation and proper weighting of a plurality of images in obtaining an optimal solution. Moreover, a process similar to triangulation allows a user to solve for and assign non-zero values to the adjustment parameters (vector A), whereby solution accuracy can be improved. Here, such users can then disseminate the improved RSM, including the new A having non-zero values, for use by subsequent users.

Thus, once the adjustable parameters are selected, the corresponding partial derivatives are calculated therewith, and the RSM covariance is in turn calculated from the corresponding partial derivatives and the rigorous sensor model error covariance. Thereafter, an actual implementation of the invention becomes straightforward, requiring only the substitution of the RSM error covariance, the adjustable parameter (definitions), and the parameterized polynomial ground-to-image function for the corresponding entities in the rigorous sensor model. The actual calculations then proceed in virtually the same manner as in the prior art rigorous sensor models, and provide potentially identical results, but with all the aforementioned advantages of abstract sensor models.

In short, this embodiment of the present invention seeks to translate all of the information contained within a support data error covariance of a conventional rigorous sensor model into an error covariance associated with an abstract sensor model. Together, the abstract sensor model and its associated error covariance (and an adjustment vector instrumental in the translation of the error covariance information) make up a replacement sensor model (RSM) that provides image exploitation, including geopositioning, that is virtually identical to the rigorous sensor model of the prior art but retains all of the advantages of a conventional abstract sensor model.

The following is a brief review of concepts and terms that will be helpful in understanding the detailed description of various exemplary embodiments discussed below. Specifically, it should be understood from the above Background section that a support data error covariance of a conventional rigorous sensor model (hereafter referred to as $C_S$) quantifies a possible extent of errors present in the support data. The support data and included errors have physical meaning in that they demonstrate actual characteristics of an operator's image sensor.

When an abstract sensor model is generated, the support data (and all the corresponding errors) are translated into the parameters of that model's transformation function (e.g., coefficients of a polynomial). At this point, the parameters still contain the same information (including errors) as the support data, but they no longer have any physical meaning. This loss of physical meaning, as discussed, is partially by design, and prevents the distribution of proprietary image sensor characteristics. Nevertheless, the translation of the physical support data into the abstract function parameters essentially camouflages the error information along with the actual support data, and, until now, has thereby prevented the generation of a useful error covariance associated with an abstract sensor model.

In an exemplary embodiment of the present invention, therefore, the characteristics of the support data and its errors of the rigorous sensor model are projected into "image space." In other words, a physical error on the "ground" or "sensor" side of the model is taken, such as might be represented by a position error of an image sensor corresponding to a ten meter error in ground location. This error is projected, or translated, onto the "image" side of the model, so that the ten meter ground error effect might be found to correspond to, for example, a twenty pixel image error.

This embodiment then projects information from the "ground" or "sensor" side of an abstract sensor model into image space. The difference between the two projections is then minimized; that is, adjustments to the transformation function of the RSM can be identified that correlate to a twenty pixel error, thus reclaiming the error information that was lost in the translation of the rigorous sensor model into the abstract sensor model parameters as discussed above. An error covariance is then generated based on the statistical characteristics of the determined adjustments. In this way, an RSM error covariance containing virtually all of the information in the rigorous sensor model error covariance can be generated.

Once the RSM error covariance is generated, it can be used within the RSM in virtually the same manner that the prior art rigorous sensor model utilized its associated error covariance. That is, once generated, parameters of the present invention can often be used simply by substituting them for their prior art counterparts in conventional algorithms and equations.

The following describes in more detail the generation and operation of the embodiment of the invention just described. An RSM may include a ground-to-imaging function such as the polynomial described above with respect to prior art abstract sensor models. However, the function is not limited to polynomials or even to rational functions (i.e., ratios of polynomials), and may include other functions such as an interpolated grid of ground point-to-image point correspondences. Such a grid can be formed by evaluating the rigorous sensor model at a grid of ground locations within the image ground footprint at different elevation planes. The resultant ground point-image point correspondence grid can then be interpolated at the exact ground point location desired, resulting in the corresponding image coordinates. Quadratic interpolation in each of the three ground coordinate components is recommended. For the purposes of clarity and example, the remainder of this disclosure will refer to the case where the function is a polynomial; however, all of the concepts presented are equally applicable to the case where the function is the interpolated grid just described.

Coefficients of the polynomial are typically generated as in the prior art; i.e., by fitting the coefficients to the support data of a particular image sensor. This may be done by fitting the parameters to a ground point-image point correspondence grid that corresponds to an image footprint and is mathematically generated (predicted) using the rigorous sensor model.

As alluded to above, it is possible to select adjustable parameters of the polynomial that reflect support data errors in the rigorous sensor model. It should be noted that the adjustable parameters are selected from a plurality of possible parameters, and, in as much as they represent initially unknown support data errors, the values of the parameters will initially be assumed to be zero. Examples of the adjustable parameters are discussed in more detail below, but include, for example, a bias correction to u, a coefficient for the change in u with respect to x, a coefficient for the change in u with respect to y, a bias correction to v, a coefficient for the change in v with respect to x, and a coefficient for the change in v with respect to y. Together these selected adjustable parameters can be thought of as forming an adjustment vector A. The vector A permits the definition and calculation of an error covariance associated with the RSM and hereinafter referred to as $C_A$. Although the values of A are initially zero since actual values of support data errors are unknown, they specify parameters for a calculation of a partial derivative $B_A$ as will be discussed below.

As will be seen, the calculation of, for example, $C_A$ and $B_A$ allow for a direct substitution for their counterparts in a rigorous sensor model calculation, and then conventional prior art techniques such as the M-image Extraction Algorithm can be practiced with the same ease and efficacy as in the prior art, but with all the additional advantages of an abstract sensor model.

A replacement sensor model according to the present invention, then, can be utilized in the following exemplary manner, as demonstrated in FIGS. 6-7. Specifically, FIG. 6 demonstrates an exemplary implementation of one embodiment of the present invention. FIG. 7 is a flowchart describing actions of an operator or system in the implementation of FIG. 6.

Figure 6:
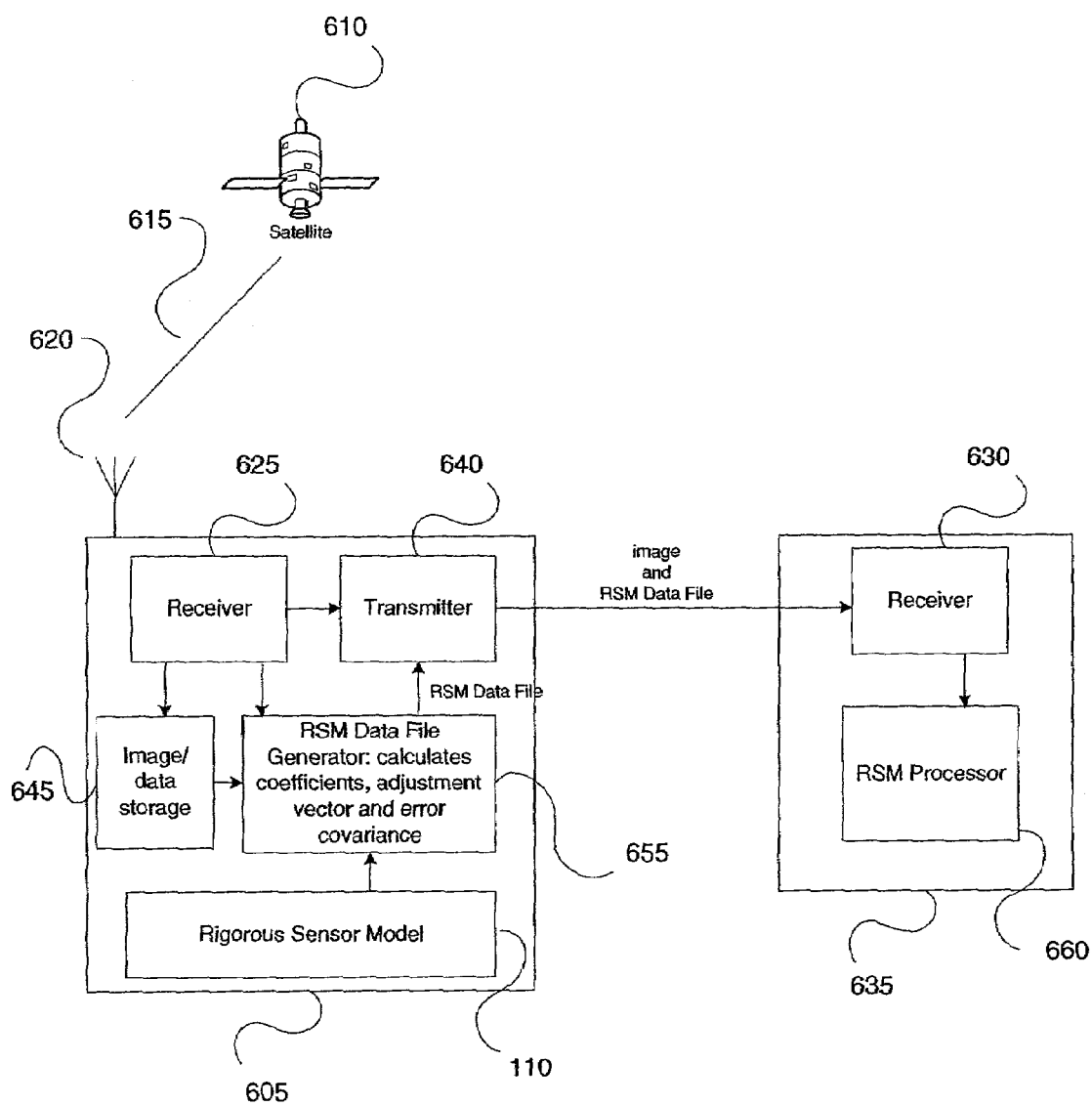
FIG. 6 demonstrates an exemplary implementation of one embodiment of the present invention.
Figure 7:
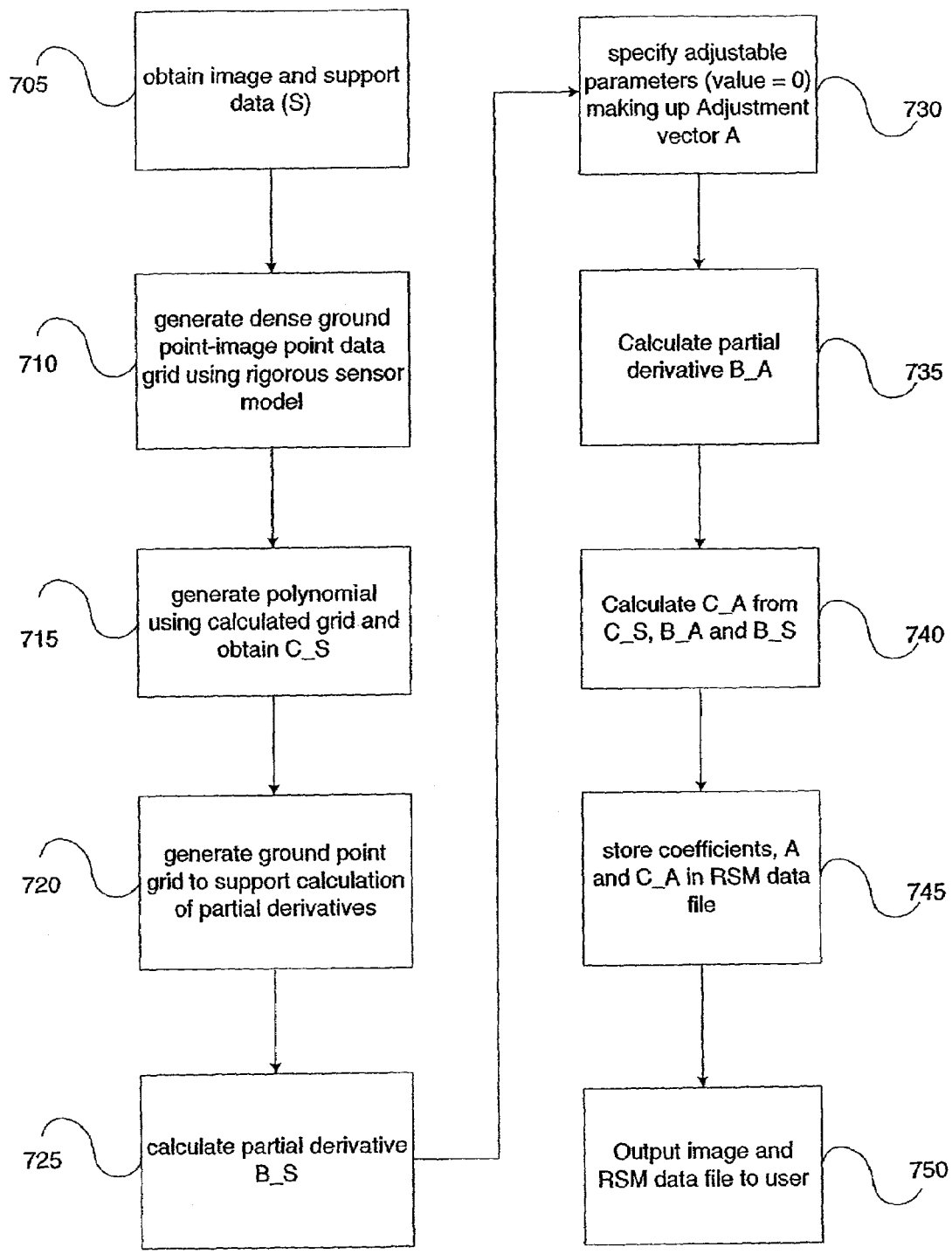
FIG. 7 is a flowchart describing the implementation of FIG. 6.

In FIG. 6, an operator 605 of an image sensor (not shown) included in an orbiting satellite 610 can receive information indicated by dashed line 615. Information 615 includes an image of a particular image footprint and support data of the image sensor at the time the image was obtained, to be stored in storage 645, by way of antenna 620 and receiver 625. The image footprint and support data may be, for example, an image of a city or a portion of a city.

Such an operator will typically have a conventional rigorous sensor model 110. Sensor model 110 is used to generate an image point-ground point correspondence grid, which in turn is used to determine the coefficients of the polynomial of the RSM, essentially as in the prior art. That is, a representative grid of ground points are chosen and input into the sensor model 110 to obtain a grid of image measurements. Note that this grid of ground points should be relatively extensive and representative of the image footprint, so as to minimize a fit error when generating the coefficients of the polynomial.

Next, a ground point grid varying in both horizontal and vertical position within the image footprint, is generated, using enough ground points to support calculation of partial derivatives $B_S$. $B_S$ represents an incremental change in the sensor model function output (u and v) with respect to a change in S, evaluated at each ground point X in the grid.

Once the operator receives the image and support data, a subset of adjustment parameters making up adjustment vector A are selected from a plurality of pre-determined possible parameters to be used with the particular image sensor within satellite 610. Choice and application of A will be discussed below with respect to FIGS. 8A and 8B. The plurality of possible parameters may be thought of as being stored for selection within storage 645.

Next, the same grid used in calculating Bs can then be used in the calculation of $B_A$, the incremental change of the polynomial output (u and v) with respect to A, evaluated at each ground point X in the grid. Also, although the vector A represents parameters that can be adjusted to reflect the presence of support data errors, these errors are initially unknown, and so the actual initial value of the vector A will be zero.

Once A, $B_A$ and $B_S$ are known (along with $C_S$), the RSM error covariance $C_A$ can be calculated as described in mathematical detail below. If $C_S$ corresponds to multiple images, each image's A, $B_A$ and $B_S$ must be computed.

In short, RSM data file generator 655 generates the coefficients for the RSM polynomial, the adjustment vector A and the associated error covariance $C_A$. These parameters are included in an RSM data file and associated with their corresponding image.

Once the above calculations have been performed on the operator side, a user 635 may wish to perform a ground point extraction from the image; for example, a user may request a location of a particular building or other structure within a city including in the image footprint. If so, the operator 605 may output the image and associated RSM data file to the user through transmitter 640, to be received at user's receiver 630. At this point, the user 635 can use the RSM data file's contents to exploit the image just as if that user had access to the actual rigorous sensor model. Specifically, for example, the user can make use of RSM processor 660 in conjunction with the RSM data file to perform error propagation analysis, an M-image Extraction Algorithm using properly weighted images (here assuming the user receives a plurality of images and associated RSM data files from operator 605), or even a type of triangulation in which actual values of A are solved for and the polynomial is actually adjusted accordingly.

The user does not need, and will not have access to, any of the actual, physical support data (or its error covariance) associated with the particular image sensor, which is cumbersome to manipulate and may be proprietary to the operator. Moreover, RSM processor 660 will provide a common interface to user 635 even if that user is obtaining images from a plurality of operators/image sensors. Thus, the user's computational requirements are severely reduced, and an ease of use of the image is greatly increased.

It should be noted that other embodiments of the invention are contemplated that operate in a similar manner to that illustrated in FIG. 6. For example, the generation of the RSM data file could take place entirely within satellite 610, and/or the image could be forwarded to user 635 directly from the satellite 610 as well.

FIG. 7 illustrates the steps performed and calculations made by operator 605. Specifically, in step 705, the operator obtains image data and support data S. In step 710, a relatively large number of ground points can be used in the rigorous sensor model function to generate a dense ground-point image point data grid. In step 715, polynomial coefficients for the RSM polynomial are generated using the dense data grid previously computed, and rigorous sensor model error covariance $C_S$ is obtained as part of the complete rigorous sensor model.

In step 720, the ground point grid varying in both horizontal and vertical sition within the image footprint, referred to above, is generated to support the future calculation of partial derivatives $B_S$ and $B_A$. Thus, in step 725, partial derivative $B_S$ can be calculated.

Once these values are known, the parameters of adjustment vector A (having their initial values set at zero) can be selected from the predetermined list of possible parameters in step 730. Thereafter, the partial derivative $B_A$ can be calculated in step 735 using the same grid used in calculating $B_S$.

Subsequently, the RSM error covariance $C_A$ can be determined from $B_A$, $C_S$, and $B_S$ in step 740. Once $C_A$ is known, RSM data file including the polynomial coefficients, A and $C_A$ can be completed and stored in step 745. Finally, when a user wishes to exploit the original image (or a plurality of images) the image(s) and associated RSM data file(s) can be output to the user in step 750.

The above description provides an overview of the nature, function and operation of the present invention, particularly at the operator side. A more detailed and mathematically complete explanation of an RSM according to the present invention (including a representative technique by which an operator might generate an error covariance $C_A$) and used in an M-image Extraction Algorithm and/or a Triangulation (as might be practiced by a user 635 in FIG. 6) follows.

The RSM error covariance $C_A$ can be defined similarly to $C_S$ in equation (2); i.e., $E\{\epsilon A \epsilon A^T\} = C_A$. $C_A$ includes the effects of all intra-image and inter-image sensor parameter uncertainties and their correlations (When multiple images are involved, the adjustment vector A is redefined to include the individual adjustment vectors A corresponding to each image. Moreover, regarding $C_A$, only the upper triangular portion is required for each group of correlated images.).

The M-image Extraction Algorithm discussed at various points above is known to perform a simultaneous, minimum variance solution of the three dimensional locations of k ground points (more precisely, the best linear unbiased estimate). It is a weighted least squares solution, and, as already referred to, relies on an iterative linearization about an initial estimate of the ground locations. Corrections to the a priori sensor support data are not solved for in the following example; i.e., no triangulation is performed. However, it is assumed that the a priori sensor support data is accurate enough to support the partial derivative calculations, a reasonable assumption for most sensors. The algorithm as expressed in equation (5) utilizes m (greater than or equal to 1) images that contain the multiple (k) ground points. It properly accounts for all error sources and their correlations.

$$X = X_0 + \delta X, \text{ where } \delta X = PB_x^T WZ, P = [P_0^{-1} + B_x^T WB_x]^{-1},$$

$$W = [\Sigma_M + B_S C_S B_S^T]^{-1}, \text{ and } Z = M - M_0; \quad (5)$$

iterate as necessary, i.e., set $X_0$ to current solution X and redo solution.

The following definitions are applicable to the above equations:

(1) $X_0$ (3 k×1) is the a priori estimate of the ground point locations and $P_0$ (3 k×3 k) its a priori error covariance (typically a large valued diagonal matrix).

(2) $\delta X$ (3 k×1) is the unbiased best estimate of the correction to $X_0$. $X = X_0 + \delta X$ is the unbiased best estimate of the ground point location and P(3 k×3 k) its a posteriori error covariance.

(3) M is the image measurements corresponding to k ground points in m images (2mk×1) and $M_0$ the original sensor model's predicted measurements, a function of $X_0$ and the sensor parameters S (mn×1) associated with m images.

(4) $\Sigma_M$(2mk×2mk) is the image mensuration error covariance (typically a diagonal matrix with (0.5 pixels)$^2$ down the diagonals); note that mensuration errors reflect imperfect identification/measurement of pixel coordinates (u,v) and are the minor term in W. $C_S$ (mn×mn) is the a priori error covariance of the sensor support data, as already defined.

(5) $B_x$(2mk×3 k) is the partial derivative matrix of M with respect to X. $B_S$(2mk×mn) is the partial derivative matrix of M with respect to support data vector S. Both $B_X$ and $B_S$ can be generated either analytically or numerically from the original sensor model about the $M_0$ operating point.

The same weighted least squares algorithm of equation (5) is also applicable when using the replacement sensor model by simply making the following substitutions as shown in equation (6):

$$C_S \rightarrow C_A(\text{mq}\times\text{mq}), B_S \rightarrow B_A(\text{2mk}\times\text{mq}), \text{ and } M_0 \rightarrow M_0^A$$
$$(2\text{mk}\times 1) \quad (6)$$

$B_A$ is the partial derivative matrix of M with respect to A, where the dimension of A is (qm×1), i.e., q adjustable parameters per image. $B_A$ as well as $B_X$ can be computed either analytically or numerically from the replacement sensor model's polynomial about the $M_0^A$ operating point. $M_0^A$ is the replacement sensor model's predicted measurements, computed from the replacement sensor model's polynomial as a function of $X_0$.

The solution a posteriori error covariance of equation (7) quantifies accuracy $$P = E\{\epsilon X \epsilon X^T\} = \begin{bmatrix} P_{11} & \cdots & P_{1k} \\ \cdots & \cdots & \cdots \\ P_{k1} & \cdots & P_{kk} \end{bmatrix} \quad (7)$$

Equation (8) represents the absolute accuracy of ground point i.

$$P_{ii} = E\{\epsilon X_i \epsilon X_i^T\} = \begin{bmatrix} \sigma_{xx}^2 & \sigma_{xy}^2 & \sigma_{xz}^2 \\ \sigma_{yx}^2 & \sigma_{yy}^2 & \sigma_{yz}^2 \\ \sigma_{zx}^2 & \sigma_{zy}^2 & \sigma_{zz}^2 \end{bmatrix} \quad (8)$$

Finally, equation (9) represents the relative accuracy between ground points i and j.

$$P_{ij}^* = P_{ii} - P_{jj} - P_{ji} = E\{(\epsilon X_i - \epsilon X_j)(\epsilon X_i - \epsilon X_j)^T\} \quad (9)$$

In short, equations (5)-(9) demonstrate the use of one embodiment of the invention in the M-image Extraction Algorithm. Thus, once the user has measured the image coordinates of the ground object(s) (as is conventional), he or she needs only the RSM processor 660 of FIG. 6 and the RSM data file to use the invention in this manner, and need only make the substitutions of equation (6) to do so. All calculations after that substitution are computed as in the prior art.

The present invention can also be used to perform a process akin to triangulation, as discussed below and demonstrated with respect to FIGS. 8A and 8B. The selection and use of the parameters making up adjustment vector A are also discussed in this context, although of course the vector A can be used in the present invention even when its value(s) are not solved for and remain zero, as demonstrated above.

A covariance-based weighted least squares adjustment with the adjustment vector's a priori error covariance providing the proper weight for the adjustment vector's current value can be made to solve for non-zero value(s) of A that reflect corrections for errors in the original support data. In this implementation, the replacement sensor model's refinement should be virtually mathematically equivalent to a corresponding triangulation, since the replacement solution (assuming the appropriate adjustable polynomial parameters) replicates the original solution for arbitrary sets of ground points. Once such non-zero values for A are determined, A can be applied to the RSM polynomial as shown in FIGS. 8A and 8B. Similarly, if one who obtains the image performs such a calculation, then the results can be forwarded on to others wishing to perform ground point extractions, who will now be able to do so more accurately.

Figure 8A:
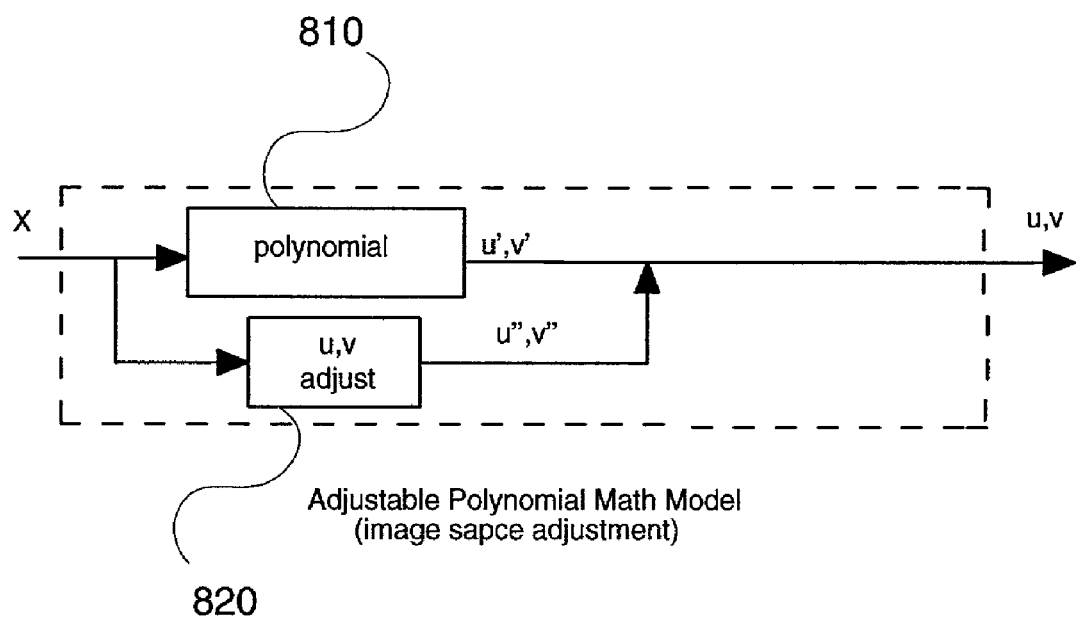
FIG. 8A demonstrates a ground space adjustment to the ground-to-image polynomial according to one embodiment of the present invention.

Specifically, in FIG. 8A, ground position vector X is input into polynomial 810, where polynomial 810 has a form and coefficients determined in the manner described above with respect to conventional replacement sensor models. Thus, polynomial 810 outputs first image coordinates (u',v'), which are then modified by adjustment vector 820. In this way, the corresponding image coordinate adjustments (u", v") are added to (u',v') to yield the image coordinate outputs (u,v). This type of adjustment is referred to as an image space adjustment, since it occurs on the image side of the polynomial. Also, it should be noted that in this scenario it is mathematically equivalent to simply change the actual coefficients of the polynomial 810 and perform a single operation.

The polynomial with an image space adjustment is of the form shown in equation (10):

$$u=(a0+a1x+a2y+a3z+a4xy+\ldots)+(\Delta a0+\Delta a1x+\Delta a2y)$$

$$v=(b0+b1x+b2y+b3z+b4xy+\ldots)+(\Delta b0+\Delta b1x+\Delta b2y), \text{and}$$

$$A^T=[\Delta a0 \Delta a1 \Delta a2 \Delta b0 \Delta b1 \Delta b2], \text{ where}$$

$\Delta a0, \ldots, \Delta b2$ are the additional adjustment parameters. (10)

As indicated above, equation (10) defines an adjustment vector A to include a set of six adjustment parameters. Although the low-order corrections effected by these adjustment parameters were determined to be well-suited for rigorous error propagation, any set of low order corrections can be defined. (Note that low order corrections can also be similarly applied to a rational polynomial, i.e., the ratio of two polynomials. However, corrections are only applied to the numerator.)

Figure 8B:
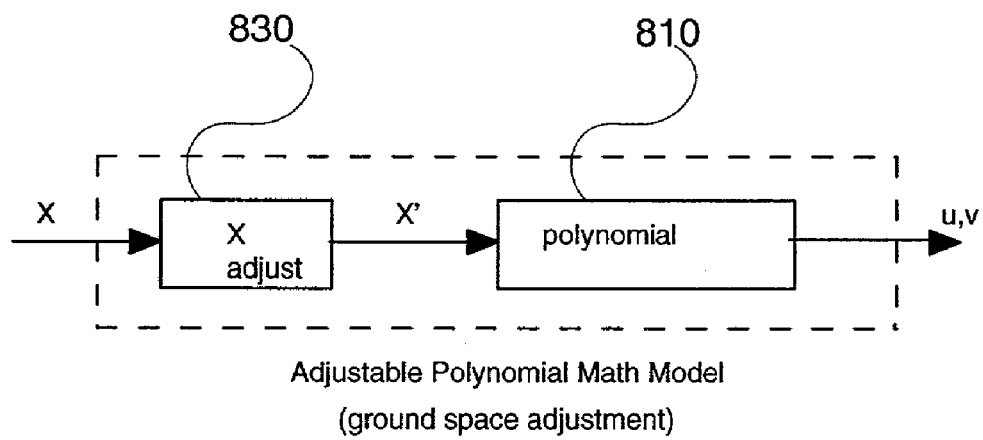
FIG. 8B demonstrates an image space adjustment to the ground-to-image polynomial according to one embodiment of the present invention.

In contrast, FIG. 8B demonstrates an adjustment vector 830 being used to adjust the ground position vector X. Thereafter, adjusted vector X' is input into polynomial 810. This type of adjustment is referred to as a ground space adjustment, since it occurs on the ground side of the polynomial.

The polynomial with a ground space adjustment is of the form shown in equation (11):

$$u=(a0+a1x'+a2y'+a3z'+a4x'y'+\ldots)$$

$$v=(b0+b1x'+b2y'+b3z'+b4x'y'+\ldots), \text{ where}$$

$$\begin{bmatrix} x' \\ y' \\ z' \end{bmatrix} = \begin{bmatrix} \Delta x \\ \Delta y \\ \Delta z \end{bmatrix} + \begin{bmatrix} 1 & \gamma & -\beta \\ -\gamma & 1 & \alpha \\ \beta & -\alpha & 1 \end{bmatrix} \begin{bmatrix} x \\ y \\ z \end{bmatrix}, \text{with}$$

$$A^T \equiv [\Delta x \ \Delta y \ \Delta z \ \alpha \ \beta \ \gamma]$$

(11)

Further note that the definition of the adjustment vector A, either via equation (10) or equation (11), allows for the computation of the partial derivative matrix $B_A$ used in equation 6.

A six element affine transformation consisting of small ground space corrections to the polynomial's independent variables was assumed in this example. These corrections are defined as the elements of the adjustment vector A. Again, although the above 6 corrections were determined to be well-suited for error propagation, other ground space adjustment parameters can be defined as would be apparent.

Note also that the coordinate system of which the adjustments are a function can be more generally represented as a local Cartesian system, centered at the image footprint, with z-axis aligned in the image locus direction, x-axis aligned in the image scan direction, and y-axis completing the right-hand coordinate system.

As referred to above, the parameters of vector A used above can be chosen from a larger list of possible parameters, for operation on the image side or ground side of the polynomial. On the image side, for example, at least the following twelve possibilities exist: a (constant) bias correction to u, a coefficient for a change in u with respect to x, a coefficient for a change in u with respect to y, a coefficient for a change in u with respect to $x^2$, a coefficient for a change in u with respect to xy, and a coefficient for a change in u with respect to $y^2$. Similar six corrections exist for v on the image side.

On the ground side, at least the following seven corrections exist from which parameters of A may be chosen: a (constant) bias correction to x, y or z, an Euler angle rotation about those three axes (represented by $\alpha$, $\beta$, $\gamma$ in equation (11)), and a scale factor adjustment to X when translating coordinate values x, y and z as described with respect to equation (11). For some images, six parameters from the above list excluding the z correction work well.

Having now demonstrated exemplary techniques for the use of this embodiment of the present invention, the following is an exemplary derivation of the error covariance $C_A$ from rigorous sensor model error covariance $C_S$ and associated partial derivatives.

In general, as referred to at the beginning of the Detailed Description, the error in the polynomial adjustment vector ($\epsilon A$) is to closely approximate the effects of the error in the original sensor support data state vector ($\epsilon S$) on an arbitrary m-image ground point solution. That is, the image measurement error due to $\epsilon A$ is to closely approximate the image measurement error due to $\epsilon S$, as shown in equation (12):

$$B_A \epsilon A \cong B_S \epsilon S \quad (12)$$

Equivalently, since the sensor model(s) are mean zero statistical models, equation (13) can be written as:

$$E\{(B_A \epsilon A)(B_A \epsilon A)^T\} \cong E\{(B_S \epsilon S)(B_S \epsilon S)^T\}, \text{ or}$$
$$B_A C_A B_A^T \cong B_S C_S B_S. \quad (13)$$

Thus, equation (13) implies that the ground point solution using the replacement sensor model closely approximates the ground point solution using the original sensor model, as shown below in equation (14). Note that equation (14) corresponds to the equations of the M-image Extraction Algorithm, as documented earlier in equation (5).

$$\delta X\_replacement = [P_0^{-1} + B_X^T(\Sigma_M + B_A C_A B_A^T)^{-1} B_X]^{-1}$$
$$B_X^T(\Sigma_M + B_A C_A B_A^T)^{-1}(M-M_0^A) \cong [P_0^{-1} + B_X^T(\Sigma_M + B_S C_S B_S^T)^{-1} B_X]^{-1} B_X^T(\Sigma_M + B_S C_S B_S^T)^{-1}(M-M_0) =$$
$$\delta X\_original, \quad (14)$$

where $MA_0^A \cong M_0$ due to negligible polynomial fit error.

Thus, $C_A$ must be generated such that equation (13) is satisfied. Since $B_A$ can not be inverted in general, and because equation (13) is to hold at arbitrary ground locations X, the generation of $C_A$ is accomplished as demonstrated in equations (15-17)

$$C_A = (B_A^{*P})(B_S^* C_S B_S^{*T})(B_A^{*P})^T, \text{ where the pseudo-inverse of } B_A \text{ equals}$$

$$B_A^{*P} = (B_A^{*T} B_A^*)^{-1} B_A^{*T}. \text{ Thus, we also have}$$

$$C_A = (B_A^{*T} B_A^*)^{-1} B_A^{*T}(B_S^* C_S B_S^{*T}) B_A^* (B_A^{*T} B_A^*)^{-T}. \quad (15-17)$$

The superscript * on the partial derivative matrices $B_A$ and $B_S$ indicate that the partial derivatives correspond to a grid of ground point locations, varying both horizontally and vertically, within the image footprints. The footprints correspond to all (correlated) images whose support data errors are represented by $C_S$. Enough ground points are chosen to capture the variation of the partial derivatives over the footprints, as well as to insure that $B_A^*$ is full rank. In addition, the number of replacement sensor model adjustable parameters per image is typically less than or equal to the number of sensor parameters per image. This facilitates $B_A^*$ being full rank and is a necessary condition for a positive definite $C_A$ (discussed later in more detail). Also, it is assumed that the a priori sensor support data errors are not so large as to render the partial derivative computations invalid.

In general, equations (15-17) correspond to multiple (m) images. Assuming n sensor parameters per image i (i=1, . . . ,m) and contained in Si, q RSM adjustment parameters per image i and contained in Ai, p ground points in image i's ground point grid, $C_S$ is a mn×mn multi-image sensor parameter error covariance matrix, and $C_A$ is a mq×mq multi-image RSM adjustable parameter error covariance matrix. In addition, $B_{Si}^*$ is defined as the 2p×n matrix of partial derivatives of image i measurements with respect to Si applicable over the image i ground point grid, and $B_{Ai}^*$ as the 2p×q matrix of partial derivatives of image i measurements with respect to Ai applicable over the image i ground point grid. Thus, components of equation (17) can be further detailed as follows:

$$(B_A^{*T}B_A^*)^{-1}B_A^{*T} = \begin{bmatrix} (B_{A1}^{*T}B_{A1}^*)^{-1}B_{A1}^{*T} & & 0 \\ & \cdots & \\ 0 & & (B_{Am}^{*T}B_{Am}^*)^{-1}B_{Am}^{*T} \end{bmatrix},$$ (18-19)

a block diagonal matrix;

$$B_S^* = \begin{bmatrix} B_{S1}^* & & 0 \\ & \cdots & \\ 0 & & B_{Sm}^* \end{bmatrix},$$ a block diagonal matrix.

The solution of equations (15-17) can also be generalized as follows. The problem of solving for $C_A$ such that the matrix norm difference of equation (20) is minimized:

$$\|B_A^* C_A B_A^{*T} - B_S^* C_S B_S^{*T}\|_F$$ (20)

The particular norm is the Frobenius norm. The Frobenius norm of a matrix is the square root of the sum of its elements squared. The solution to this minimization problem is demonstrated by equation (21):

$$C_A = B_A^{*+}(B_S^* C_S B_S^{*T})B_A^{*+T},$$ (21)

In equation (21), the superscript+ indicates the Moore-Penrose Generalized Inverse. The Moore-Pensrose Generalized Inverse of a matrix is based on the Singular Value Decomposition of the matrix.

When $B_A^*$ is full rank, $B_A^{*+}$ becomes the pseudo-inverse $B_A^{*P}$, and equation (21) is equivalent to equations (15-17). Thus, the solution for $C_A$ of equation (21) is only required for the pathological case when $B_A^*$ is not full rank. Also, when $B_A^*$ is full rank, the solution of equations (15-17) minimizes the Frobenius norm as well.

In short, for a given adjustment vector A (definition), $C_A$ is computed such that its projection to image space closely approximates the projection of the support data error covariance of the rigorous sensor model onto image space, as was discussed at the beginning of the Detailed Description. In addition, this process can be used to select an optimal A (definition). In particular, an A can be selected such that its corresponding minimum Froebenius norm value is also minimal compared to the minimum Froebenius norm values computed for other A candidates. The candidates can be selected manually, or can be selected automatically using an algorithm which selects combinations of A components from the list of all possible candidates. In addition, the above selection process may be augmented with a positive definite constraint on the A and corresponding $C_A$ candidates. That is, $C_A$ must also be a positive definite matrix (discussed below in more detail).

Finally, an alternate solution is presented that ensures $C_A$ is positive definite. That is, the solution of equations (15-17) ensures a positive semi-definite matrix, which is required for the M-image Extraction Algorithm. For a reasonable selection of adjustable parameters, and with a number of elements no greater than the corresponding numbers of sensor support data error parameters, $C_A$ is typically positive definite as well. However, a triangulation solution requires that $C_A$ be positive definite (and therefore invertible as well). Equation (22) ensures $C_A$ is positive definite, but is typically only used when the previous algorithm does not yield a positive definite matrix.

Equation (22) requires that the number of ground points in the evaluation grid must be limited such that $B_A^*$ is approximately a square matrix. If not, $C_A$ can become too small when the rank of $B_S^*$ exceeds the rank of $B_A^*$.

$$C_A = [C_{A0}^{-1} + B_A^{*T}(C_Z + B_S^* C_S B_S^{*T})^{-1} B_A^*]^{-1}$$ (22)

In equation (22), $C_Z$ is a diagonal matrix with a small amount of measurement uncertainty ((0.1 pixels)$^2$) down the diagonals. $C_{A0}$ is a diagonal matrix representing a large amount of uncertainty in A. For example, $C_{A0}$ may represent an amount of uncertainty equivalent to (2000 m)$^2$ ground uncertainty for each element of A.

In conclusion, the replacement sensor model of the present invention may be used in place of the original, rigorous sensor model. This replacement sensor model provides for adjustability of the ground-to-image function and significantly improves error propagation information, such that the error propagation information is virtually equivalent to that available in a complete original sensor model.

This allows for optimal image exploitation when using the new replacement sensor model. In addition, the new replacement sensor model retains the overall user community benefits afforded by replacement sensor models in general. These include low development and maintenance costs, a common interface, and the potential for wider dissemination of proprietary imagery.

While this invention has been described in various explanatory embodiments, other embodiments and variations can be effected by a person of ordinary skill in the art without departing from the scope of the invention.

What is claimed is:

1. A method for generating a replacement sensor model data file for use in processing image data produced by an image sensor, the method comprising:
   generating parameters of a ground-to-image transformation function based on a sensor model of the image sensor, the sensor model including support data describing physical characteristics of the image sensor;
   defining adjustable parameters of the ground-to-image transformation function to reflect errors in the support data;
   generating an adjustment error covariance based on the adjustable parameters and containing information approximately equivalent to information contained in a support data error covariance; and
   outputting the data file, wherein the data file includes the parameters, the adjustable parameters and the adjustment error covariance.

2. The method of claim 1, wherein the ground-to-image transformation function is a polynomial and its parameters are coefficients of the polynomial.

3. The method of claim 1, wherein the ground-to-image transformation function is a grid of ground point-image point correspondences and characteristics of the grid reflect interpolations of the grid.

4. The method of claim 1, wherein the ground-to-image function is a ratio of polynomials and its parameters are coefficients of the polynomials.

5. The method of claim 1, wherein values of the adjustable parameters are initially assumed to be zero.

6. The method of claim 1, wherein said defining adjustable parameters of the ground-to-image transformation function to reflect errors in the support data further comprises:
selecting the adjustable parameters from a pre-determined list of possible adjustable parameters.

7. The method of claim 6, wherein said generating an adjustment error covariance based on the adjustable parameters and containing information approximately equivalent to information contained in a support data error covariance further comprises:
computing the adjustment error covariance that minimizes a difference between its projection onto image space and a projection of the support data error covariance onto image space.

8. The method of claim 7, wherein the adjustable parameters are chosen so as to optimize the minimization of the difference between the projections of the two error covariances.

9. The method of claim 7, wherein the adjustments form an adjustment vector, and further wherein non-zero values of the adjustment vector are solved for and applied to a ground side or an image side of the ground-to-image transformation function, so as to reduce an effect of support data errors on future operations of the replacement sensor model.

10. The method of claim 1, wherein said generating an adjustment error covariance based on the adjustable parameters and containing information approximately equivalent to information contained in a support data error covariance further comprises:
generating a ground point grid varying in both horizontal and vertical position within a footprint of an image corresponding to the image data;
calculating a first partial derivative matrix representing an incremental change in an output of the sensor model with respect to the support data, evaluated at each ground point within the ground point grid; and
calculating a second partial derivative matrix representing an incremental change of the ground-to-image transformation function with respect to the adjustable parameters, evaluated at each ground point within the ground point grid.

11. The method of claim 10, wherein said generating an adjustment error covariance based on the adjustable parameters and containing information approximately equivalent to information contained in a support data error covariance further comprises:
generating the adjustment error covariance based on the first and second partial derivatives matrices and the support data error covariance.

12. A replacement sensor model for generating a replacement sensor model data file for use in image data processing, comprising:

A ground-to-image function for processing ground data obtained by an image sensor, the function being generated from data describing physical characteristics of the image sensor;

An adjustment vector for adjusting the function so as to reflect errors in the data;

An error covariance associated with the adjustment vector that contains approximately the same information as an error covariance of a rigorous sensor model of the image sensor; and An output function for outputting the data file.

13. A system for generating a replacement sensor model data file for use in processing image data produced by an image sensor, the system comprising:
a processor;
a memory, operatively coupled to the processor, for storing logical instructions wherein execution of the logical instructions by the processor results in the performing of at least the following operations:
generating parameters of a ground-to-image transformation function based on a sensor model of the image sensor, the sensor model including support data describing physical characteristics of the image sensor;
defining adjustable parameters of the ground-to-image transformation function to reflect errors in the support data;
generating an adjustment error covariance based on the adjustable parameters and containing information approximately equivalent to information contained in a support data error covariance; and
outputting the data file, wherein the data file includes the parameters, the adjustable parameters and the adjustment error covariance.

14. The system of claim 13, wherein the operations further comprise selecting the adjustable parameters from a pre-determined list of possible adjustable parameters.

15. The system of claim 13, wherein the operations further comprise selecting adjustable parameters which minimize a difference between a projection of the support data error covariance onto image space and a projection of the adjustment error covariance onto image space, whereby an optimal adjustment error covariance is generated.

16. The system of claim 13, wherein the operations further comprise:
generating a ground point grid varying in both horizontal and vertical position within a footprint of an image corresponding to the image data;
calculating a first partial derivative matrix representing an incremental change in an output of the sensor model with respect to the support data, evaluated at each ground point within the ground point grid; and
calculating a second partial derivative matrix representing an incremental change of the ground-to-image transformation function with respect to the adjustable parameters, evaluated at each ground point within the ground point grid.

* * * * *

UNITED STATES PATENT AND TRADEMARK OFFICE
CERTIFICATE OF CORRECTION

PATENT NO.        : 7,310,440 B1                                              Page 1 of 1
APPLICATION NO.   : 10/038644
DATED             : December 18, 2007
INVENTOR(S)       : John Thomas Dolloff It is certified that error appears in the above-identified patent and that said Letters Patent is hereby corrected as shown below:

On the title page, Item (73), Assignee: please delete "BAE Systems Information and Electronic Systems Integration Inc." and insert therefor --BAE Systems Mission Solutions Inc.--

Signed and Sealed this

Twenty-eighth Day of September, 2010

David J. Kappos
*Director of the United States Patent and Trademark Office*